UNITED STATES PATENT OFFICE 2,079,854

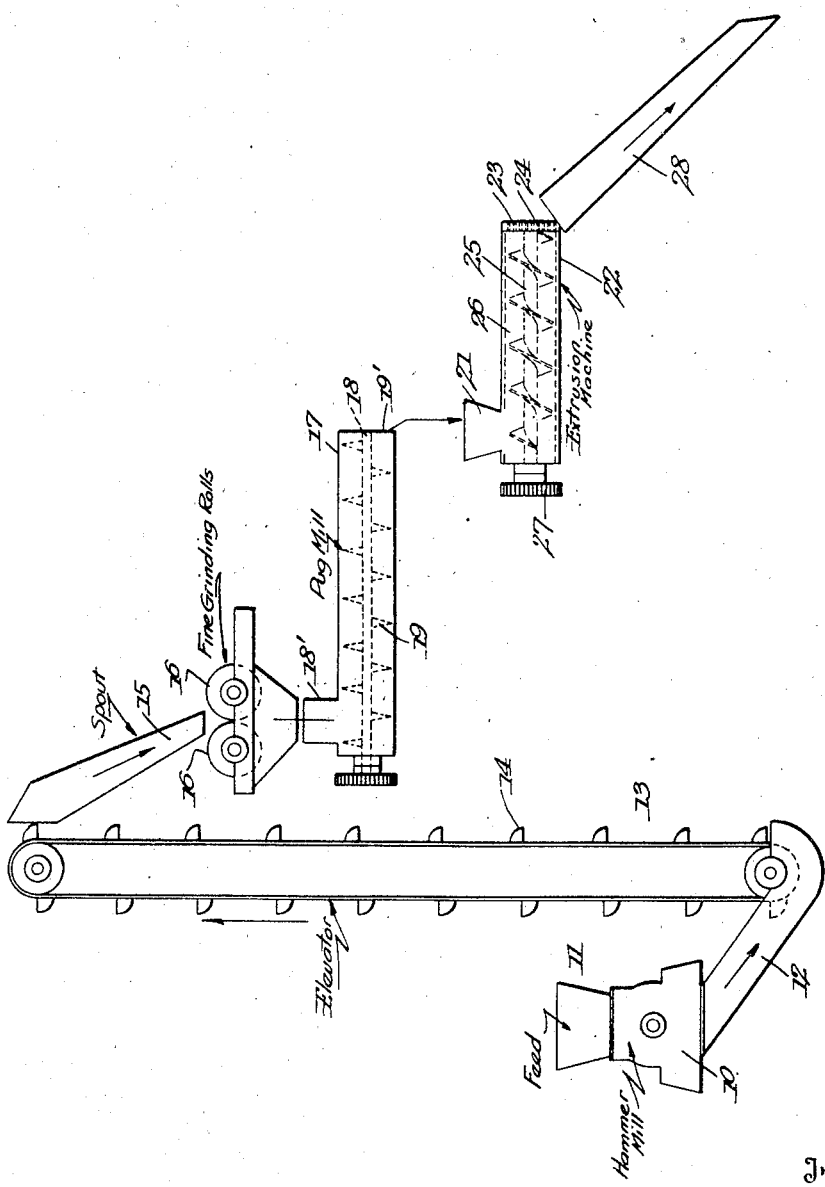

PROCESS FOR TREATING NATURALLY ACTIVE EARTH AND PRODUCT THEREOF

Frank W. K. Hartshorne, Quincy, Fla., assignor to Floridin Company, Warren, Pa., a corporation of Delaware Application August 27, 1936, Serial No. 98,232

20 Claims. (Cl. 252—2)

The present invention relates to the treatment of earth, and more particularly to the treatment of naturally active clays, such as fuller's earth, for use in the refining, purifying, and decolorizing of oils.

The present application is a continuation-in-part of my pending application Serial No. 700,149, filed November 28, 1933, and entitled "Substance preparation".

It is common practice to treat mineral oils with various clays, and particularly fuller's earth, which is mined in the State of Florida and in other parts of the United States. Various methods are used, such as the percolation of the oil through a confined body of earth or the mixing of the earth with the oil. One of the principal uses of the earth is to decolorize oil and fuller's earth has come to be widely used for this purpose in the United States. Fuller's earth from various sections of the country, such as the State of Florida, has heretofore been recognized as having a substantially fixed or limited range of efficiency, particularly in decolorizing. Various attempts have been made to improve this material, but so far as I am aware, no one has heretofore provided a processed fuller's earth, the decolorizing efficiency of which has been appreciably enhanced.

An object of the invention is to provide fuller's earth which has substantially increased or enhanced efficiency, i. e., an increase of commercially useful character, for example of 10% or higher as compared to earth available prior to the present invention, and more particularly in decolorizing and refining oil.

Another object of the invention is to provide an improved process for preparing fuller's earth which is economical, and which will produce a product having definitely improved decolorizing properties.

Prior to the present invention, it has been proposed to dry and comminute fuller's earth, and, after mixing the same with sufficient water to form a smooth plastic mass, to form the mass into bodies of desired shape, as by forcing the mass through forming dies. Such proposals are to be found in the patent to Boykin No. 1,744,610, granted January 21, 1930 and in the patent to Ikeda et al., No. 1,630,660, granted March 31, 1927.

I have found that the mere reduction of fuller's earth and its formation into bodies of desired shape, as heretofore proposed, does not appreciably increase the decolorizing efficiency of fuller's earth, and that the shape or form has no bearing upon its decolorizing efficiency.

The present invention is based upon the discovery that by subjecting the fuller's earth to a pressure sufficient to grind and disrupt the same, as by extruding the earth through a die, its decolorizing efficiency may be substantially increased provided the earth is subjected to effective pressure. By "effective pressure", I mean the pressure directly applied to the various particles of material, as at the orifice or orifices of the extrusion die, or at the surfaces of the pressure applying means should other instrumentalities be utilized. When the material is extruded, I prefer pressures at the extrusion die substantially in excess of 100 pounds per square inch, although these pressures will vary considerably with the particular clays being worked. When extruding fuller's earth which is mined in Gadsden County of the State of Florida, I find that extrusion pressures from 100 up to 500 pounds and over per square inch increase the decolorizing efficiency from 10% to 40%, depending upon the pressure selected and the particular clay being treated; appreciable enhanced efficiency ordinarily is not obtained until the effective pressure increases above 100 pounds. By "appreciable" enhanced efficiency, I mean an increase in efficiency of substantial or commercially valuable character, e. g., of the order of 10% or higher.

By "efficiency", I mean the capacity of earth to perform its refining functions. By "decolorizing efficiency", I refer to the adsorptive and decolorizing properties of the earth and mean the capacity of the earth to decolorize, in terms of amount of earth used or quantity of oil decolorized to a predetermined standard by a fixed amount of treated earth as compared to the natural earth which has not been processed, as herein described.

As will be understood, the decolorizing effect desired is predetermined; that is to say, refiners desire to bring their oils or other substances to a fixed or predetermined color standard which varies with different substances. It is furthermore desired that the earth employed have a relatively high capacity or efficiency for such decolorizing treatment in terms of the volume of oil which may be decolorized by predetermined quantities of earth and before replacement is necessary. The efficiency of the earth is, therefore, measured in terms of the volume of oil it will decolorize prior to its loss of capacity for decolorization.

The invention is also based upon the discovery that the treatment of the earth before it is subjected to pressure, as by extrusion, has a direct effect upon the improvement in efficiency which is obtainable. Processes have heretofore been proposed in which the fuller's earth is dried or completely dehydrated, thereafter being remoistened and subjected to mere forming pressure to produce desired shapes. I have discovered that when a suitable amount of combined moisture is not retained and ordinarily 2% or more, for example, will be found sufficient, the substantially complete dehydration of the earth largely counteracts if it does not completely negative the improvement obtainable by the pressure treatment. The percentage of combined moisture varies in different clays; the combined moisture in Florida fuller's earth as mined averages from 9 to 14% by weight. Any reference herein to moisture content means percentage by weight. The treatment prior to application of pressure for increased efficiency should not reduce the combined moisture to a point where it is less than 2%, and preferably the combined moisture content should be maintained in excess of 6%. By "combined moisture", I mean moisture which is held in chemical combination and is given off by the clay only when subjected to temperatures above 212° F. By "free moisture", as used throughout this specification, I mean moisture which is given off when the earth is subjected to temperatures up to and including 212° F.

Moreover, I find that it is preferable that the clay, when subjected to the pressure treatment should have a free moisture content sufficient to render it suitably plastic; I find that a free-moisture content in excess of 40%, and preferably of from 45 to 55% is desirable and will give suitable plasticity. In some instances, this moisture content may be permitted to run as high as 60%, provided the other factors are controlled to provide the proper effective pressure in the extrusion step. In rare cases, less than 40% free moisture may be found suitable.

I have also found that dust (sometimes called "fines"), normally produced in the manufacture of granular decolorizers may be utilized. I prefer to mix the dust with ground or reduced fuller's earth, and it is desirable that the combined and free moisture content of the mixture be controlled in the manner above described. The dust should not be of a character in which the combined moisture content has been reduced to a point below 2%, preferably being 6% or over, and that the free moisture of the mixture should be as above set forth. Should the natural free moisture in the earth be below the amount desired or in the mixture of dust and earth be lower, the percentage may be raised by adding water.

I have found that, in some instances, the dust or "fines" may be utilized alone, it being desirable, however, that the fines utilized shall not have had their combined moisture reduced below 2% and that the free moisture content be sufficient to afford the desired plasticity; I find that when extruded or otherwise subjected to pressure, a moisture content of from 40% to 60% is satisfactory. I prefer that the combined moisture be approximately 6%, and the free moisture approximately 45%.

As previously explained, I prefer to retain some of the natural free moisture of the mined fuller's earth so far as is practicable, and such free moisture as may be lost during the reducing step or steps may be replaced, and if desired increased, by the addition of water as in a pug mill.

As an example of the process when fines are not used, I utilize Florida fuller's earth containing about 45% of free moisture and having a combined moisture content of from 9% to 14%. This material as mined contains relatively large particles, and I prefer to reduce the same; this reduction may be accomplished by wet grinding in which I use a hammer mill followed by a roll grinding mill. Thereafter, sufficient water should be added if the percentage of free moisture is not as high as desired but the water added should be controlled so that the product is not so fluid that it is not adapted to receive in the subsequent pressure step the effective pressure required for increasing its decolorizing efficiency. I prefer a free moisture content of from 45% to 55%, and, as stated, the combined moisture should not be below 2%, and preferably should be above 6%.

Following the reduction of the material, it is subjected to pressure as by forcing the same through an orifice or orifices under pressures at the die plate containing the orifice or orifices which may vary from the neighborhood of 100 pounds per square inch to 500 pounds and higher. In treating certain Florida earths, I find that, under an effective pressure of approximately 500 pounds per square inch, there is an increase of efficiency of approximately 40%, and that the efficiency increases sharply from 100 pounds pressure to 500 pounds. Comparing the pressure at the die plate to the pressure exerted by the forcing instrumentality, such as a ram or screw, it will be found that this effective pressure per square inch is, of course, considerably lower than the total pressure applied through the ram which may run from a thousand to three or four thousand pounds per square inch, depending upon the mechanism used. These higher figures, mentioned in my copending application above referred to, represent the total applied pressure at the forcing ram or screw. The effective pressure at the die plate is the most accurate guide in determining the amount of pressure desired for efficiency increase.

The effective pressure utilized, as at the die plate, will vary with different clays, and will also vary with the plasticity or fluidity of the mass being extruded, it being essential that the pressure applied be sufficient to increase appreciably the decolorizing efficiency as compared to clay which has not been subjected to the pressure or extrusion step. For example, I may take Florida fuller's earth containing about 45% free moisture, and this material without substantial reduction is forced through the orifice of an extrusion die which may be from one-eighth to five-eighths of an inch in diameter. Without increase in moisture content, and in the absence of reduction to small size particles, the pressure required will be somewhat higher, and I refer here not only to the effective pressure, but also to the total pressure applied through the forming instrumentality as set forth above and in my copending application hereinbefore mentioned. In this instance, the material is not reduced any more than is necessary to have the same enter the extrusion apparatus.

After the material has been subjected to pressure, it is then dried to reduce the free moisture content, all of which may be removed, if desired, without impairing or reducing the efficiency of the earth.

In determining the pressures to be utilized with particular clays the increase in efficiency desired will, of course, be a determining factor. I have not found any maximum pressures which are harmful. Generally, the effective pressure used should be a working pressure, i. e. applied in such a way that the material flows during the pressure operation, as when extruded, and is not static as when merely compressed in a mold. This distinction between static and flowing pressure I have found of considerable importance since the grinding and intermingling action accompanied during flow under pressure has a decided enhancing effect. As an example, I find that when filtering a 40%–60% (by volume) solution of 600 Bradford, Pa. steam refined oil in Stoddard solvent naphtha, I obtain a yield of 1480 gallons of oil-naphtha solution of 5 A. S. T. M. color per ton of Florida clay dried at 1200° F., whereas with the same clay pressure treated as herein described before drying and screening to size, I obtain a yield of 1924 gallons of solution per ton of clay.

There is a change in the physical structure of the cellular earth resulting from effective pressure applied in this manner, since the decolorizing capacity of the earth varies with or is a direct function of the active cellular adsorbent area thereof which is accessible to the liquid (e. g., petroleum hydrocarbon oil that is undergoing decolorization). The enhancement or improvement in the decolorizing efficiency of the earth is probably attained by increasing the area or volume of the active cells and possibly by making active certain cells which were previously relatively inactive or "blind", and, therefore, contributed relatively little or no adsorptive decolorizing capacity. In the processing of the earth by effective pressure, as described, there is a physical change in which these relatively "blind" or inactive cells materially add to the active cell surface areas contactable by the oil either because of disruption, change of shape, or both. I believe that substantially new or different channels or pores are formed enabling the oil to contact more effectively surfaces previously having little or no decolorizing efficiency. In other words, the adsorptive capacity of the earth is increased by newly formed cellular surfaces and by newly formed minute connecting pores.

For example, when using dust I may add to the wet ground and reduced earth, before the pressure or extrusion step, a percentage of dust or fines, heretofore largely regarded as waste. If water is to be added to raise the free moisture content, this may be done in a pug mill and the fines may be added at this stage. The percentage of fines may vary through a considerable range, and I have used up to 35%, although there is no reason why a substantially larger percentage cannot be employed. It is important when using the fines to see that the free moisture content of the fines is sufficiently high to afford the plasticity required to produce in the pressure step the effective pressure desired, and as above stated, I prefer a free moisture content of from 40% to 60%, preferably in the neighborhood of 46%. Moreover, it is important that the fines be of a character in which their combined moisture is not below 2%. This material is subjected to pressure as above described to produce a hard product in which the particles are well bonded and may be subsequently dried to substantially reduce or eliminate entirely the free moisture.

According to my process when using dust or "fines" exclusively, it is desirable that they have a combined moisture content not less than 2% and preferably in the neighborhood of 7%. The free moisture content should be as in the examples previously given, and it may be increased by adding water. This material is then subjected to pressure as in an extrusion apparatus, the pressure at the die plate being effective to produce a decolorizing efficiency appreciably increased over and above the fines which have not been subjected to pressure. If the fines have been obtained as a by-product of my process, it may not be necessary to subject the same to a further extrusion or pressure step, and I may use only pressures necessary to form the same into particles of desired size and hardness, this being the primary object of the step when using previously extruded fines. Here again, it is desirable to use fines which have a combined moisture content of not less than 2%, but preferably above 6%, and a free moisture content within the ranges hereinbefore specified.

Instead of or in addition to the fines, I also mix with the earth prior to the pressure or extrusion step, one or more activated or acid treated materials, such as bentonite, bauxite, carbon or montmorillonite in suitable percentage. The following pressure or extrusion step not only increases the efficiency of the fuller's earth, but thoroughly mixes the earth and activated material, thereby insuring a homogeneous product in which the materials are uniformly distributed. In providing this mixture, it is important that the fuller's earth be present in an amount sufficient to form a suitable bond for the other material, and the percentage of the fuller's earth will, of course, vary with different earths and with the activated materials which are being combined therewith. If desired, other binders may be utilized, although the same are not essential. This combining of activated materials with fuller's earth permits the use of these activated materials in granular form, and the fuller's earth serves not merely as a binding agent, but also as an active decolorizer which itself has its efficiency increased in the process of combining the same with the activated material.

It will be understood that the process may be practiced by any suitable apparatus, and in the accompanying drawing, I have shown somewhat diagrammatically, an apparatus which has been used.

Referring to the drawing, 10 indicates a hammer mill of conventional construction, having a hopper 11, into which the mined fuller's earth is introduced for reduction to suitable size, for example which will pass through a three-quarter mesh screen, although the precise size to which it is reduced is of no particular importance. From the mill, the material is delivered through a chute 12 to a suitable elevator 13, having a series of buckets 14. The elevator, in turn, delivers the material through a chute or spout 15 to a further grinding instrumentality, which may take the form of a pair of grinding rolls 16, 16. These grinding rolls may be adjusted so that there is a space therebetween of suitable size, for example one-eighth of an inch, and the rolls are driven at suitable speeds, such as 250 revolutions per minute. The material leaves the grinding rolls in further reduced state, fragments of the same being relatively flat, and may then enter a pug mill 17, consisting of a housing and a longitudinal shaft 18 having a series of spirally disposed paddles 19 adapted to direct the material from the entrance end 18' to the exit end 19'. The shaft and paddles may be driven through an external gear 20 by any suitable means (not shown). The pug mill is employed for the purpose of mixing water with the earth to raise the free moisture content, or to mix fines therewith. If neither water nor fines are to be used, the pug mill or any equivalent instrumentality may be eliminated and the material may be taken directly from the grinding rolls to the extrusion apparatus now to be described.

Upon being discharged from the exit end 19' of the pug mill, material is directly introduced into the hopper 21 of a suitable pressure apparatus, which, in the present instance, is shown as an extrusion machine. As diagrammatically illustrated, this apparatus consists of a housing 22, having at one end a die plate 23 having a plurality of orifices 24; these orifices may be from one-eighth to five-eighths of an inch in diameter, as desired. As will be understood, the invention is not limited to any particular shape or size of die opening; the openings or orifices may be formed to produce an extruded product of any cross-sectional shape or design desired. If a hollow or tubular product is desired, a die of a construction conventionally used for this purpose may be employed. The material is forced to and through the die plate by means of a rotating shaft 25 having suitable means, such as a worm 26 thereon, and the shaft is continuously driven through an external gear 27 from a source of power (not shown). The extrusion apparatus effects a thorough grinding and intermingling of the earth necessary to produce the increase in decolorizing and adsorptive properties. As will be understood, other instrumentalities, such as rolls or plates may be used for this purpose.

From the extrusion machine the material is discharged through a chute 28 to suitable driers of any conventional construction and ground and screened to any desired size.

It will be understood, of course, that the apparatus above described may be varied considerably without departing from the invention, and that I have illustrated and described a typical apparatus merely for the purpose of clarifying the invention, and not to limit the same in any respect.

I claim:

1. The art of enhancing the adsorptive capacity of a naturally active adsorptive earthy cellular decolorizer, comprising subjecting plastic earth to compression in excess of 100 pounds per square inch and thereby to disrupt and make active the blind cells and increase the active working adsorbent cellular surface of the earth by the adsorptive surface of the walls of such disrupted cells.

2. The process of increasing the adsorptive capacity of a naturally active earthy cellular decolorizer, which consists in subjecting said decolorizer while retaining in part its natural moisture to flow under pressure in excess of 100 pounds per square inch and thereby to disrupt and make active the blind cells and increase the active cellular surface of the decolorizer.

3. The process of producing an earthy cellular decolorizer, which consists in subjecting by extrusion, a naturally active cellular decolorizer having in part its natural moisture, to extrusion pressure in excess of 100 pounds per square inch and thereby to disrupt and make active the blind cells and increase the active cellular surface of the decolorizer, so that the compressed decolorizer issues in the form of a slightly plastic rod, then drying said slightly plastic rod, and then reducing said dried rod to granular or like form.

4. The process of increasing the adsorptive capacity of a naturally active earthy cellular decolorizer, composed at least in part of the dust resulting from the manufacture of a granular decolorizer, which consists in moistening said decolorizer, and then subjecting said moistened decolorizer to flow under pressure in excess of 100 pounds per square inch and thereby to disrupt and make active the blind cells and increase the active cellular surface of the decolorizer.

5. The process of treating fuller's earth which consists in subjecting the same in a plastic state having free moisture and a suitable portion of its initial combined moisture to extrusion pressure in which the pressure on the extruded material is in excess of 100 pounds per square inch whereby to increase appreciably its adsorptive capacity as compared to the same earth which has not been extruded.

6. As a new article of manufacture, fuller's earth in granular-like form which, containing a suitable portion of its natural combined moisture, has been subjected to extrusion while under a pressure on the material sufficient to increase its adsorptive capacity from 10% to 40% as compared to the same earth which has not been extruded.

7. The process of treating fuller's earth which consists in subjecting the same in a state having sufficient water to make it plastic and a suitable portion of its initial combined moisture content to extrusion in which the pressure on the extruded material is sufficient to increase its adsorptive capacity in excess of 10% as compared to the same earth which has not been extruded, and then drying and reducing the material to granular-like form.

8. The process of treating fuller's earth which consists in subjecting the same in a plastic state and having a combined moisture content of not less than approximately 6% to extrusion in which the pressure on the extruded material is sufficient to increase its adsorptive capacity in excess of 10% as compared to the same earth which has not been extruded, and then drying and reducing the material to granular-like form.

9. The improved process of treating a naturally active earthy decolorizer, such as fuller's earth, which consists in subjecting the same in plastic state and with a suitable part of its initial combined moisture to simultaneous flow and pressure sufficient to increase its adsorptive capacity in excess of 10% as compared to the same earth which has not been subjected to pressure.

10. The improved process of treating a naturally active earthy decolorizer, such as fuller's earth, which consists in subjecting the same in plastic form and while retaining combined moisture in excess of 2% to flow under pressure in excess of 100 pounds per square inch whereby to increase its adsorptive capacity in excess of 10% as compared to the same earth which has not been subjected to pressure.

11. The improved process of treating a naturally active earthy decolorizer, such as fuller's earth, which consists in subjecting the same in plastic form and while retaining combined moisture in excess of 2% to flow under pressure of approximately 500 pounds per square inch.

12. The process of producing an earthy cellular decolorizer which consists in subjecting a naturally active cellular decolorizer, such as fuller's earth, having a combined moisture content of not less than 2% and a free moisture conten in excess of 40% to extrusion under pressure effective to increase its adsorptive capacity in excess of 10% as compared to the same earth which has not been extruded.

13. The process of producing an earthy cellular decolorizer which consists in subjecting a naturally active cellular decolorizer, such as fuller's earth, having a combined moisture content of not less than approximately 2% and a free moisture content in excess of 40% to extrusion under pressure sufficient to increase its adsorptive capacity from 10% to 40% as compared to the same earth which has not been extruded.

14. The process of treating fuller's earth which consists in subjecting the same in a state having a free moisture content sufficient to make it plastic and combined moisture in excess of 2% to extrusion in which the pressure on the extruded material at the extrusion die is sufficient to increase its adsorptive capacity from 10% to 40% as compared to the same earth which has not been extruded.

15. The process of treating natural fuller's earth which consists in subjecting the same in a plastic state having a combined moisture content of not less than 2% to extrusion in which the pressure on the material at the extrusion die is substantially in excess of 100 pounds per square inch.

16. The process of treating fuller's earth which consists in subjecting the same in a plastic state and having a suitable portion of its initial combined moisture to extrusion and regulating the pressure at the extrusion die to provide an increase in efficiency from 10% to 40% as compared to the same earth which has not been extruded, in accordance with the efficiency increase desired.

17. A process as specified in claim 9, in which the earth has combined therewith prior to the application of pressure thereto a suitable percentage of "fines".

18. A process as specified in claim 7, in which the earth has combined therewith prior to the application of pressure thereto a suitable percentage of "fines".

19. A process as specified in claim 9, in which the earth has combined therewith prior to the application of pressure thereto a suitable percentage of activated material.

20. A process as specified in claim 7, in which the earth has combined therewith prior to the application of pressure thereto a suitable percentage of activated material.

FRANK W. K. HARTSHORNE.